Feb. 16, 1960

A. E. BIERMANN 2,924,972

FLUID FLOWMETER

Filed Dec. 30, 1955

INVENTOR
ARNOLD E. BIERMANN

BY
R. I. Tompkins
ATTORNEYS

Feb. 16, 1960  A. E. BIERMANN  2,924,972
FLUID FLOWMETER
Filed Dec. 30, 1955  2 Sheets-Sheet 2

INVENTOR
ARNOLD E. BIERMANN
BY
R. S. Tompkins
ATTORNEYS

United States Patent Office 2,924,972
Patented Feb. 16, 1960

2,924,972

FLUID FLOWMETER

Arnold E. Biermann, Cleveland, Ohio

Application December 30, 1955, Serial No. 556,758

11 Claims. (Cl. 73—204)

(Granted under Title 35, U.S. Code (1952), sec. 266)

The invention described herein may be manufactured and used by or for the Government of the United States of America for governmental purposes without the payment of any royalties therein or therefor.

The present invention relates to improvements in meters for measuring the rate of flow of fluid in ducts. The present meter is essentially a heat transfer device and comprises a pair of identical probes, one being heated and the other being unheated, and each being mounted in a tubular orifice. Fliud is permitted to flow through the orifices and to flow axially along the probes. The temperature rise of the heated probe is measured by a thermopile having hot junction thermocouples mounted in the heated probe and cold junction thermocouples mounted in the unheated probe.

The foregoing arrangement has a number of advantages over the conventional resistance type of hot wire anemometer. Very precise measurements of change of resistance are required with such devices, whereas the present invention provides a large voltage indication from the thermopile which, when measured with a galvanometer or potentiometer circuit, indicates temperature rise which is independent of circuit resistance, as will be clearly set forth as the description proceeds.

It is, also, to be pointed out that the placing of both probes containing the hot and cold elements of the thermopile in the fluid stream, inherently compensates for the effect of the temperature level of the fluid.

The measurement of rate of flow by means of a hot wire device located in a duct is subject to a number of inaccuracies that have heretofore prevented satisfactory use of such devices. In this type of measuring instrument, a source of error is the change of velocity profile across the duct with change from laminar to turbulent flow, i.e. a change in Reynolds number from below the critical value to above the critical value. With laminar flow, (low velocity) the average velocity across the duct is roughly 0.5 of the maximum velocity at the center of the duct, whereas with turbulent flow the average velocity is approximately 0.8 of the maximum velocity at the center of the duct. Because the point at which the flow changes from laminar to turbulent flow (the transition point) is uncertain and depends on whether the flow is increasing or decreasing, it is apparent that a single point measurement or an average flow rate measurement along the radius of the duct, such as might be obtained with a hot wire, will not give an accurate measurement of flow in the transition region.

The present invention avoids the foregoing difficulty to a large degree by placing the heated area in a region of high fluid accelerations, such as the vena contracta of an orifice. In this region, the flow impinges upon the surface of each probe and minimizes differences in boundary layer build-up caused by changes in Reynolds number.

A further difficulty in the use of hot wire anemometers lies in the accumulation of foreign materials on the surfaces. Foreign particles, varnish deposits, etc., have a major effect on the heat transfer characteristics of small wires, such as are generally used in these devices, while the effect is insignificant on cylindrical surfaces several hundred times larger in diameter, as are used in the present invention.

One of the most troublesome problems in the prior art has been to provide a practical flowmeter which is free of the many sources of error which are present in devices using heat transfer principles for the purpose of measuring fluid flow. One of the most troublesome aspects of prior art devices has been the slow and different responses of the various parts to fluid temperature changes. Such meters generally measure temperature rise or temperature difference. If the temperature sensing devices for measuring two temperatures do not respond at the same rate for each temperature, serious errors are present in the measurements. It is important that each sensing device responds at the same rate, as such meters are inherently adapted to measure very low velocities. The velocities are generally so low that if one of the temperature sensing stations is placed in the stream only a few inches ahead of the other sensing station, the time required for the fluid to flow from one station to the other may be so great as to cause serious errors in case of a change in temperature of the fluid between the stations.

In the present invention, the foregoing disadvantages have been obviated as will be hereinafter more fully described.

An object of the present invention is to provide a meter for measuring the rate of flow of fluids in an accurate manner and wherein compensation is made for changes in fluid density.

Another object is to provide a meter for measuring the rate of flow of fluids having low pressure drop and which withstands high fluid pressures.

Still another object is to provide a meter for measuring the rate of flow of fluids which is compact, simple in construction, and reliable in operation.

A further object is to provide a fluid flowmeter having identical hot and cold probes which are identically mounted and which is free of many of the errors common in prior art meters.

A still further object is to provide a fluid flowmeter having a high percentage voltage response with changes in rate of flow.

Yet another object is to provide a fluid flowmeter wherein a large electrical indication is obtained for low heat transfer surface temperatures.

A final object is to provide a fluid flowmeter which measures weight flow of fluid regardless of the temperature and density of the fluid.

Other objects and many of the attendant advantages of this invention will be readily appreciated as the same becomes better understood by reference to the following detailed description when considered in connection with the accompanying drawings wherein.

Figure 1:
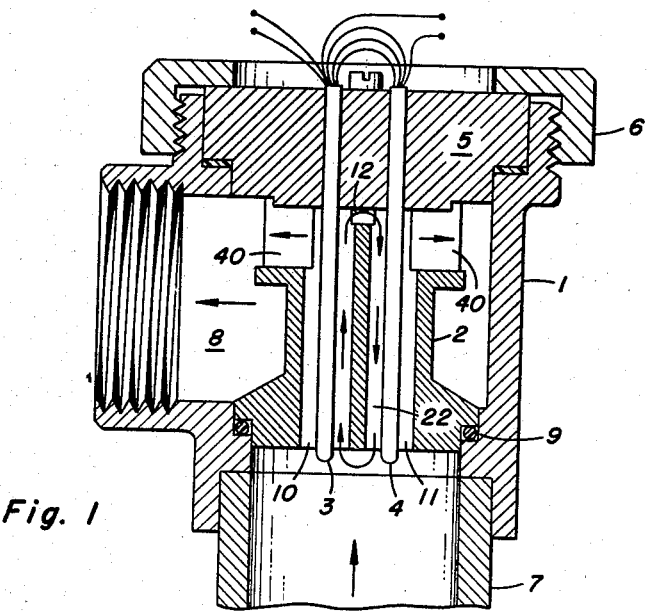
Fig. 1 is a sectional view of the flowmeter of the present invention.
Figure 2:
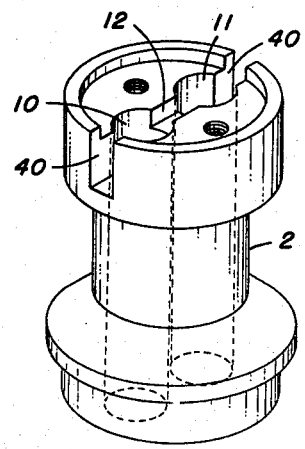
Fig. 2 is a perspective view of the orifice housing.

Referring more particularly to the drawings, wherein like numerals indicate like parts throughout the several views, in Figs. 1 and 2, 1 indicates the casing for the sensing element. Casing 1 has mounted therein an orifice housing 2, a heated probe 3 and an unheated probe 4. Housing 2 and probes 3 and 4 are supported on a cover 5 which is secured in casing 1 by a nut 6. The fluid to be measured enters the sensing element through an inlet duct 7 at the lower end of casing 1, and is discharged through a discharge passage 8 formed in the side of casing 1. Orifice housing 2, at the lower end thereof, is sealed with respect to casing 1 by a packing ring 9. A pair of parallel tubular orifices 10 and 11 are formed in housing 2 and are connected at the top thereof by a connecting duct 12. There are also provided outlet openings 40 in housing 2 whereby orifices 10 and 11 communicate with passage 8.

Figure 3:
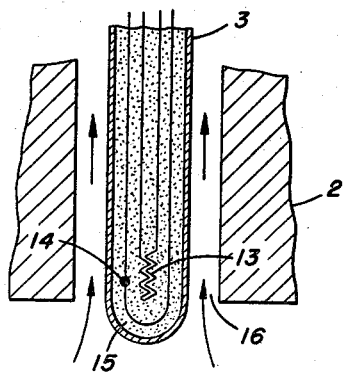
Fig. 3 is a sectional view of a heat transfer tube or probe and the flow orifice and showing the relative positions of the orifice flow vena contracta, the heat transfer surface, and the thermocouple element of the thermopile.

Referring now to Fig. 3, heated probe 3 comprises a noninductive electrical heating element 13 constructed of a material such, for example, a manganin, which has a very low change in resistance with respect to change in temperature. Mounted exteriorly of the heating element 13 and within the shell of the probe are the thermocouples 14 of a thermopile. The elements of the thermocouples 14 are formed of materials such, for example, as iron and constantan, or any other suitable combination which provides a substantially constant voltage response per unit of temperature change over a wide range of temperatures. The heating element 13, thermocouples 14 and the shell of the probe are electrically insulated from each other by means of a cement 15 or other suitable insulating material. Heating element 13 is of short axial length and is located at the average converging point of the vena contracta 16 of the fluid stream.

Figure 4:
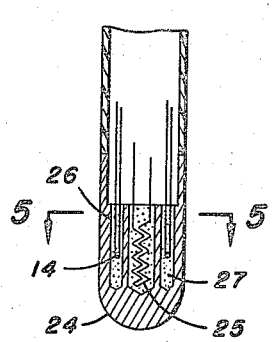
Fig. 4 is a view in section of an alternate construction of a heat transfer tube.
Figure 5:
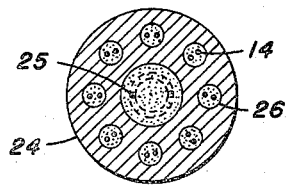
Fig. 5 is a sectional view taken along the line 5—5 of Fig 4.

Figs. 4 and 5 show an alternate form of probe in which the tip 24 is constructed of a metal having a very high thermal conductivity such, for example, as silver. The thermocouples 14 are imbedded in a cement 27 in bores 26 formed in tip 24. The heater element 25 is constructed of electrically insulated wire which has a low temperature-resistance coefficient such, for example, as oxide coated manganin wire. This construction permits a wider range of temperature indication than is possible with the form of the invention shown in Fig. 3 because the thermocouples more nearly measure the outside surface temperature.

In the forms of the invention shown in Figs. 3 and 4, the coefficient of thermal conductivity of the materials used in the heat flow path from the thermocouples 14 to the outer walls of tubes 3 and 24 respectively, is such that there is effected a flowmeter calibration that is independent of the temperature of the flowing fluid.

Figure 6:
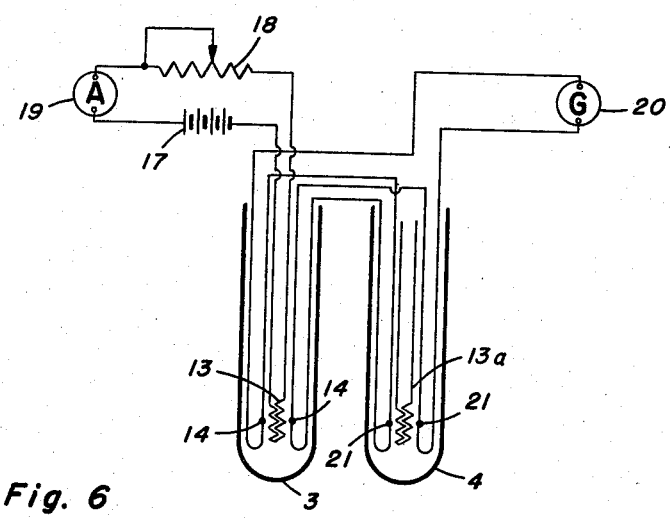
Fig. 6 is a wiring diagram of the heating element circuit and the thermopile circuit.

In the diagram of Fig. 6, the heating element 13 of probe 3 is connected to a D.C. source 17 or, if desired, an A.C. source may be provided, which is regulated by a rheostat 18 and measured by an ammeter 19. The temperature difference between the heated probe 3 and the unheated probe 4 is indicated by a galvanometer 20 (or if desired a potentiometer) as a voltage output of a thermopile which comprises hot junction thermocouples 14 and and cold junction thermocouples 21. As shown, the structure of the probes 3 and 4 is identical, each containing a heating element 13 and 13a respectively. This is for uniformity, although the element 13a is not employed to heat probe 4 nor is it connected in the circuit.

Figure 7:
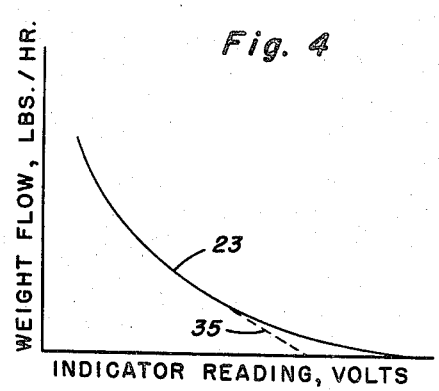
Fig. 7 is a diagram showing a typical calibration curve.

In operation the heat input to the orifice containing heated probe 3 is maintained constant by regulating the current flow. After calibration, the voltage reading from the thermopile is an indication of rate of flow through the meter. For both liquids and gases, the weight flow indication is substantially independent of the temperature and the pressure of the fluid. A typical calibration is shown in Fig. 7.

Figure 8:
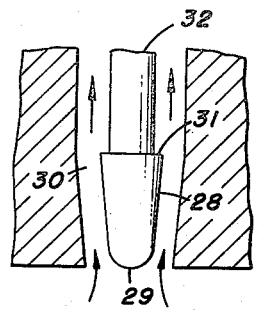
Fig. 8 is a partial sectional view similar to Fig. 3 and showing another alternate form of a probe or heat transfer tube.

Fig. 8 shows another form of probe wherein the heated area 28 thereof is in the form of a truncated cone. The truncated portion of the cone is faired over in the shape of a rounded cap portion 29. The probe is placed in a cylindrical passage or, as shown, in an expanding passage 30. This construction provides a radial acceleration of the fluid outward from the axis of the probe, thus to minimize the formation of a boundary layer on surface 28. The surface 28 is interrupted by an abrupt step 31 where it joins the support 32. The step 31 provides a means of producing turbulence aft of the step and fixes the point of boundary layer build-up. Without the step, the point of boundary layer build-up may shift axially along the probe. The exact position of the point of build-up depends upon whether the flow of fluid is increasing or decreasing. As the heat transfer is affected by the shifting of the point of build-up, such shifting is to be avoided if an accurate reading of fluid flow is to be obtained.

The meter of the present invention may also be employed by holding the temperature constant and reading weight flow as a function of the current required to maintain the temperature constant.

Because of the exceptionally low operating velocities in flowmeters of the type of the present invention, the effect of natural convection currents becomes quite pronounced at low fluid flows. During the condition of no flow of fluid through the meter, the main source of cooling of the heated probe is by natural convection. Under such condition, unless the convection currents are provided with well-defined path of circulation the convection currents are irregular in their behavior and cause a fluctuating temperature indication. The foregoing condition may render the meter unusable under low fluid flow. The present invention avoids this condition by providing the convection path as shown by the arrows 22 in Fig. 1. In this path the fluid is heated by the heated probe 3, rises in orifice 10, flows through the connecting duct 12 and falls through the unheated orifice 11 as it is cooled. If the natural convection path is unobstructed, the convection velocity will be high and the reading of the meter will follow a path as shown by line 35 of Figure 7. If the convection path is obstructed, but not completely closed, the meter reading at low flow will be higher and without fluctuations, as shown by line 23 of Figure 7. This latter curve provides a distinct advantage in that the usable range of the meter is greatly extended. In other words, provision of a metered convection return path by use of the connecting duct 12 permits an extended meter flow range by providing a non-fluctuation reading at low flows combined with an extended calibration curve.

The present invention also provides a high percentage voltage response with change of flow. For example, as shown in Fig. 7, it is desirable, in order to achieve accuracy of readings, to have the calibration curve cover as much of the voltage scale as possible. The percentage voltage response is highest when all the heat transfer area is immersed in the velocity stream and when the temperature is a direct indication of the temperature of the heat transfer area. In general, this requires that the heating element be cooled mainly by the velocity stream and that heat conduction into low velocity regions be held to a minimum. The foregoing principles are employed in the device of the present invention.

The present invention also provides means whereby a large electrical indication is obtained for low heat transfer temperatures. Elevated surface temperatures cause gas formation on the heat transfer surfaces which may produce large errors in measurement. The foregoing is achieved by the use of the thermopile for measurement of the temperature rise.

As shown in Fig. 1, it is clear that the entire meter structure is readily disassembled to clean the heat transfer surfaces without altering the location thereof with respect to the tubular orifices and to permit easy interchange of orifices to secure different flow ranges.

As heretofore stated, the present invention provides identical heated and unheated probes which are identically mounted on a surface having a substantially uniform temperature. This surface is obtained by mounting the probes on a comparatively large block of metal having high thermal conductivity such, for example, as copper. This mounting block is shown at 5 in Fig. 1.

The present invention provides a flowmeter which measures weight flow of fluid regardless of temperature and density. As large changes in the temperature of some fluids cause a change in the calibration curve, or response, of the meter it is advantageous to provide a means of compensating for such changes. Compensation for fluid temperature changes is provided in the present invention through the use of materials forming the heat flow path from the thermocouples to the fluid, having variation of coefficient of thermal conductivity with change in temperature of sufficient magnitude to substantially compensate for effects of change in fluid temperature. In this manner a single calibration curve of weight flow can be obtained regardless of fluid temperature changes.

Obviously many modifications and variations of the present invention are possible in the light of the above teachings. It is therefore to be understood that within the scope of the appended claims the invention may be practiced otherwise than as specifically described.

What is claimed is:

1. In a flowmeter of the heat transfer type, a flow duct, a pair of orifices in said flow duct, a pair of probes in said orifices, one of said probes having a heated area therein, a thermopile having hot and cold junction thermocouples, the hot junction thermocouple being mounted in the heated area of said one probe, the cold junction thermocouple being mounted in the other of said probes, the heated area of said one probe being located in one of said orifices in the region of the fluid stream vena contracta, and means for indicating the product of the velocity and density of fluid flowing through said flow duct as a function of temperature difference between said hot and cold junction thermocouples of said thermopile.

2. In a flowmeter of the heat transfer type, a fluid flow duct, a pair of parallel, vertical tubular orifices in said flow duct, a pair of probes mounted in said orifices, one of said probes being electrically heated and the other of said probes being unheated, a thermopile having hot junction thermocouples and cold junction thermocouples, the hot junction thermocouples being mounted in said heated probe and the cold junction thermocouples being mounted in said unheated probe, means for establishing a convection path between said probes whereby the fluid is heated and rises in said one of said orifices containing the heated probe and is replaced by fluid which returns through the one of said orifices containing the unheated probe, and measuring means for indicating the flow of fluid in said fluid flow duct as a function of the electrical output of said thermopile.

3. In a device of the class described, a fluid flow duct, a pair of parallel vertical tubular orifices formed in said fluid flow duct, a thermopile having hot and cold junction thermocouples, an electrically heated probe mounted in one of said orifices and containing said hot junction thermocouples, an unheated probe mounted in the other of said orifices and containing said cold junction thermocouples, means for establishing a metered fluid circulation path around said probes whereby as the fluid is heated by said heated probe and rises in the orifice thereof the fluid is replaced by fluid which returns through said other orifice containing the unheated probe, and measuring means for indicating the flow of fluid in said duct as a function of the electrical output from said thermopile.

4. In a flowmeter element of the class described, a fluid flow duct, a pair of parallel vertical tubular orifices formed in said fluid flow duct, a substantially uniform temperature surface in said flow duct, a pair of identical probes positioned in an identical manner in said orifices and identically supported from said uniform temperature surface, a thermopile element containing hot and cold junction thermocouples in a plane transverse to said duct, one of said probes containing said hot junction thermocouples, the other of said probes containing said cold junction thermocouples, electrical means connected to one of said probes for heating said probe, and means for indicating the flow of fluid as a function of the electrical output of said thermopile.

5. In a flowmeter, a fluid flow duct, a pair of tubular orifices arranged for parallel flow in said flow duct, a substantially uniform temperature surface in said fluid flow duct, a pair of probes positioned in said orifices and supported at one end by said uniform temperature surface, a thermopile having hot thermocouples and cold thermocouples in a plane transverse to said duct, said hot thermocouples being mounted in one of said probes, said cold thermocouples being mounted in the other of said probes, electrical heating means for said one of said probes, and means for indicating the flow of fluid in said flow duct as a function of the electrical output of said thermopile, said uniform temperature surface for supporting said probes being readily removable from said fluid flow for cleaning.

6. In a fluid flowmeter of the heat transfer type, a fluid flow duct, a pair of parallel vertical tubular orifices providing for parallel streams of fluid in said flow duct, a substantially uniform temperature surface in said fluid flow duct, a first probe with a locally heated area and a second unheated probe supported at one end on said uniform temperature surface, an electrical resistance element having a substantially constant change in resistance with change in temperature for heating said locally heated area, each of said probes projecting into one of said orifices, a thermopile having hot and cold thermocouples, said hot thermocouples being mounted in said first probe, said cold thermocouples being mounted in said second probe, the locally heated area of said first probe being located in the reduced portion of the fluid stream through the orifice individual thereto, means for establishing a metered fluid circulation path around said probes whereby as the fluid is heated by said heated area and rises in the tubular orifice thereof it is replaced by fluid from the tubular orifice containing the unheated probe, said thermopile having a substantially constant electrical response per unit of temperature difference over a usable range of temperature, said probes being identically constructed and identically located in said tubular orifices and identically supported from said uniform temperature surface, and measuring means for indicating the fluid flow as a function of the electrical output of said thermopile.

7. In a flowmeter of the class described, a fluid flow duct, a pair of identically constructed conical probes mounted in said flow duct, means surrounding said conical probes to provide the highest fluid velocity over said probes, electrical means for heating one of said probes, the other of said probes being unheated, a thermopile comprising hot and cold junction thermocouples, the hot junction thermocouples being mounted in said heated probe, the cold junction thermocouples being mounted in said unheated probe, and means for indicating the difference in temperature of the unheated and heated probes substantially as a product of the velocity and density of a fluid flowing in said duct.

8. In a flowmeter of the class described, a fluid flow duct, a pair of identically constructed conical probes mounted in said flow duct, electrical means for heating one of said probes, the other of said probes being unheated, a thermopile comprising hot junction and cold junction thermocouples, said hot junction thermocouples being mounted in said heated probe, said cold thermocouples being mounted in said unheated probe, means for indicating the difference in temperature of the unheated probes substantially as a product of the velocity and density of a fluid flowing in said duct, means surrounding said conical probes for accelerating said fluid away from the axis of said probes as said fluid flows over said probes.

9. In a flowmeter of the class described, a fluid flow duct, a pair of identically constructed conical probes mounted in said flow duct, one of said probes being a heated probe and the other of said probes being unheated, a thermopile comprising hot junction and cold junction thermocouples, said hot junction thermocouples being mounted in said heated probe, said cold junction thermocouples being mounted in said unheated probe, means for indicating the difference in temperature of the unheated and heated probes substantially as a product of the velocity and density of a fluid flowing in said duct, means surrounding said conical probe to provide the highest fluid velocity over the heated areas of said probes.

10. A fluid flowmeter comprising, a casing having an inlet and an outlet for passage of fluid into and out of said casing, flow restrictive means mounted within said casing and having formed therein a plurality of vertical tubular orifices communicating at one end thereof with said inlet and at the other end thereof with said outlet, a probe having heating means axially positioned in one of said orifices, an unheated probe axially positioned in the other of said orifices, reduced duct means communicating between said orifices, whereby natural convection of said fluid heated by said heated probes is accomplished, means for varying the heat output of said heating means, hot junction thermocouples mounted in said heated probe, cold junction thermocouples mounted in said unheated probe, and means for measuring the output of said hot and cold junction thermocouples thereby to provide a reading indicative of the flow of fluid through said orifices.

11. A fluid flowmeter comprising, a casing having an inlet and outlet for passage of fluid through said casing, means mounted in said casing and providing a pair of orifices for the passage of said fluid, a heated probe axially mounted in one of said orifices, an unheated probe mounted in the other of said orifices, hot junction thermocouples mounted in said unheated probe, cold junction thermocouples mounted in the other of said probes, means for establishing a convection path from one of said probes to the other of said probes, and means for measuring the output of said hot and cold junction thermocouples.

References Cited in the file of this patent

UNITED STATES PATENTS

| | | |
|---|---|---|
| 1,222,492 | Thomas | Apr. 10, 1917 |
| 1,724,296 | Mac Gregor-Morris | Aug. 13, 1929 |
| 1,987,642 | Schueler | Jan. 15, 1935 |
| 2,016,660 | Weeks | Oct. 8, 1935 |
| 2,329,840 | Keinath | Sept. 21, 1943 |
| 2,446,283 | Hulsberg | Aug. 3, 1948 |
| 2,543,588 | Nelson | Feb. 27, 1951 |
| 2,591,195 | Picciano | Apr. 1, 1952 |
| 2,633,747 | Lindstrom | Apr. 7, 1953 |
| 2,647,401 | Hathaway | Aug. 4, 1953 |

FOREIGN PATENTS

| | | |
|---|---|---|
| 712,351 | France | July 20, 1931 |
| 177,936 | Austria | Mar. 25, 1954 |